(12) United States Patent
Tao et al.

(10) Patent No.: US 10,852,632 B2
(45) Date of Patent: Dec. 1, 2020

(54) TRANSPARENT SCREEN SHEET, TRANSPARENT SCREEN, AND IMAGE DISPLAY SYSTEM

(71) Applicant: AGC Inc., Chiyoda-ku (JP)

(72) Inventors: Yukihiro Tao, Chiyoda-ku (JP); Kenta Sekikawa, Chiyoda-ku (JP); Yuriko Kaida, Chiyoda-ku (JP)

(73) Assignee: AGC Inc., Chiyoda-ku (JP)

( * ) Notice: Subject to any disclaimer, the term of this patent is extended or adjusted under 35 U.S.C. 154(b) by 1 day.

(21) Appl. No.: 15/989,897

(22) Filed: May 25, 2018

(65) Prior Publication Data
US 2018/0275505 A1    Sep. 27, 2018

Related U.S. Application Data

(63) Continuation of application No. PCT/JP2016/084776, filed on Nov. 24, 2016.

(30) Foreign Application Priority Data

Dec. 1, 2015 (JP) ................................. 2015-235236

(51) Int. Cl.
*G03B 21/62* (2014.01)
*G02B 5/02* (2006.01)
(Continued)

(52) U.S. Cl.
CPC ............... *G03B 21/62* (2013.01); *G02B 5/02* (2013.01); *G02B 5/0278* (2013.01);
(Continued)

(58) Field of Classification Search
CPC .............................. G03B 21/604; G03B 21/62
See application file for complete search history.

(56) References Cited

U.S. PATENT DOCUMENTS 7,854,513 B2 * 12/2010 Quach .................. G03B 21/604
257/40
9,952,494 B2 * 4/2018 Tao .......................... G02B 5/02
(Continued)

FOREIGN PATENT DOCUMENTS

CN       1312919      9/2001
CN     104160306    11/2014
(Continued)

OTHER PUBLICATIONS

International Search Report dated Jan. 31, 2017 in PCT/JP2016/084776, filed on Nov. 24, 2016 ( with English Translation).
(Continued)

*Primary Examiner* — Christopher E Mahoney
(74) *Attorney, Agent, or Firm* — Oblon, McClelland, Maier & Neustadt, L.L.P.

(57) ABSTRACT

A transparent screen sheet that displays images projected from a front side of the transparent screen sheet and/or a rear side of the transparent screen sheet to a user on the front side, and causes the user on the front side to view a rear background behind the rear side. The transparent screen sheet includes an image display layer configured to display the images; and a resin film that holds the image display layer. A difference between a maximum value and a minimum value of retardations of the resin film measured by irradiating a main surface of the resin film with a light with a wavelength of 460 nm in a direction orthogonal to the main surface, within a region on the main surface that overlaps with the image display layer, is one fourth of the wavelength of the light or less.

10 Claims, 5 Drawing Sheets

(51) Int. Cl.
*H04N 5/74* (2006.01)
*G02B 5/08* (2006.01)

(52) U.S. Cl.
CPC .............. *G02B 5/0284* (2013.01); *G02B 5/08* (2013.01); *H04N 5/74* (2013.01)

(56) References Cited

U.S. PATENT DOCUMENTS

| | | | |
|---|---|---|---|
| 2001/0005282 A1 | 6/2001 | Etori et al. | |
| 2006/0181769 A1* | 8/2006 | Kumasawa | G03B 21/604 359/449 |
| 2012/0319999 A1 | 12/2012 | Kamiya | |
| 2014/0104690 A1* | 4/2014 | Sandre-Chardonnal | B32B 17/10 359/599 |
| 2014/0153090 A1* | 6/2014 | Takenouchi | G03B 21/602 359/453 |
| 2017/0168294 A1* | 6/2017 | Yamaguchi | G02B 27/0101 |
| 2018/0180982 A1* | 6/2018 | Yamaki | G02B 5/02 |
| 2018/0188643 A1* | 7/2018 | Shiraishi | G02B 5/02 |

FOREIGN PATENT DOCUMENTS

| | | |
|---|---|---|
| JP | 5-249564 | 9/1993 |
| JP | 2004094191 | 3/2004 |
| JP | 2005-43740 | 2/2005 |
| JP | 2007-171468 | 7/2007 |
| JP | 2008-33242 | 2/2008 |
| JP | 2008-151912 A | 7/2008 |
| JP | 2010-7048 | 1/2010 |
| JP | 2012-32513 | 2/2012 |
| JP | 2014-115593 | 6/2014 |
| JP | 2014-115597 | 6/2014 |
| JP | 2014-141055 | 8/2014 |
| WO | WO 2015159829 | 10/2015 |

OTHER PUBLICATIONS

Written Opinion dated Jan. 31, 2017 in PCT/JP2016/084776, filed on Nov. 24, 2016.

* cited by examiner

TRANSPARENT SCREEN SHEET, TRANSPARENT SCREEN, AND IMAGE DISPLAY SYSTEM

CROSS-REFERENCE TO RELATED APPLICATION

The present application is a continuation application filed under 35 U.S.C. 111(a) claiming benefit under 35 U.S.C. 120 and 365(c) of PCT International Application No. PCT/JP2016/084776 filed on Nov. 24, 2016 and designating the U.S., which claims priority of Japanese Patent Application No. 2015-235236 filed on Dec. 1, 2015. The entire contents of the foregoing applications are incorporated herein by reference.

BACKGROUND OF THE INVENTION

1. Field of the Invention

The disclosure herein generally relates to a transparent screen sheet, a transparent screen, and an image display system.

2. Description of the Related Art

A typical screen displays images projected from a front side of the screen or from a rear side of the screen to a user on the front side of the screen. Because the screen is dedicated for displaying images, the user cannot view a rear background behind the rear side of the screen (See Japanese Unexamined Patent Application Publication No. 2012-032513, for example).

SUMMARY OF THE INVENTION

Technical Problem

Transparent screens have been developed. A transparent screen includes a transparent screen sheet, and a transparent plate that holds the transparent screen sheet. The transparent screen sheet displays images projected from a front side of the screen or from a rear side of the screen to a user on the front side of the screen, and causes the user to view a rear background behind the rear side of the screen. The transparent screen sheet includes an image display layer that displays images and a resin film that holds the image display layer.

When images were projected onto a conventional transparent screen, an iridescent stripe pattern was generated. The problem was more evident in the case of using a short focus projector as the projector for projecting images.

The present invention was made in view of the aforementioned problem, and mainly aims at providing a transparent screen sheet that controls against generation of an iridescent stripe pattern.

Solution to Problem

In order to solve the aforementioned problem, an aspect of the present invention provides a transparent screen sheet that displays images projected from a front side of the transparent screen sheet and/or a rear side of the transparent screen sheet to a user on the front side of the transparent screen sheet, and causes the user on the front side of the transparent screen sheet to view a rear background behind the rear side of the transparent screen sheet. The transparent screen sheet includes an image display layer configured to display the images; and a resin film that holds the image display layer.

A difference between a maximum value and a minimum value of retardations of the resin film measured by irradiating a main surface of the resin film with a light with a wavelength of 460 nm in a direction orthogonal to the main surface, within a region on the main surface of the resin film that overlaps with the image display layer, is less than or equal to one fourth of the wavelength of the light.

Effect of Invention

According to an aspect of the present invention, a transparent screen sheet that controls against generation of an iridescent stripe pattern, is provided.

BRIEF DESCRIPTION OF THE DRAWINGS

Other objects, features and advantages of the present invention will become more apparent from the following detailed description when read in conjunction with the accompanying drawings, in which.

DETAILED DESCRIPTION OF THE PREFERRED EMBODIMENTS

Figure 1:
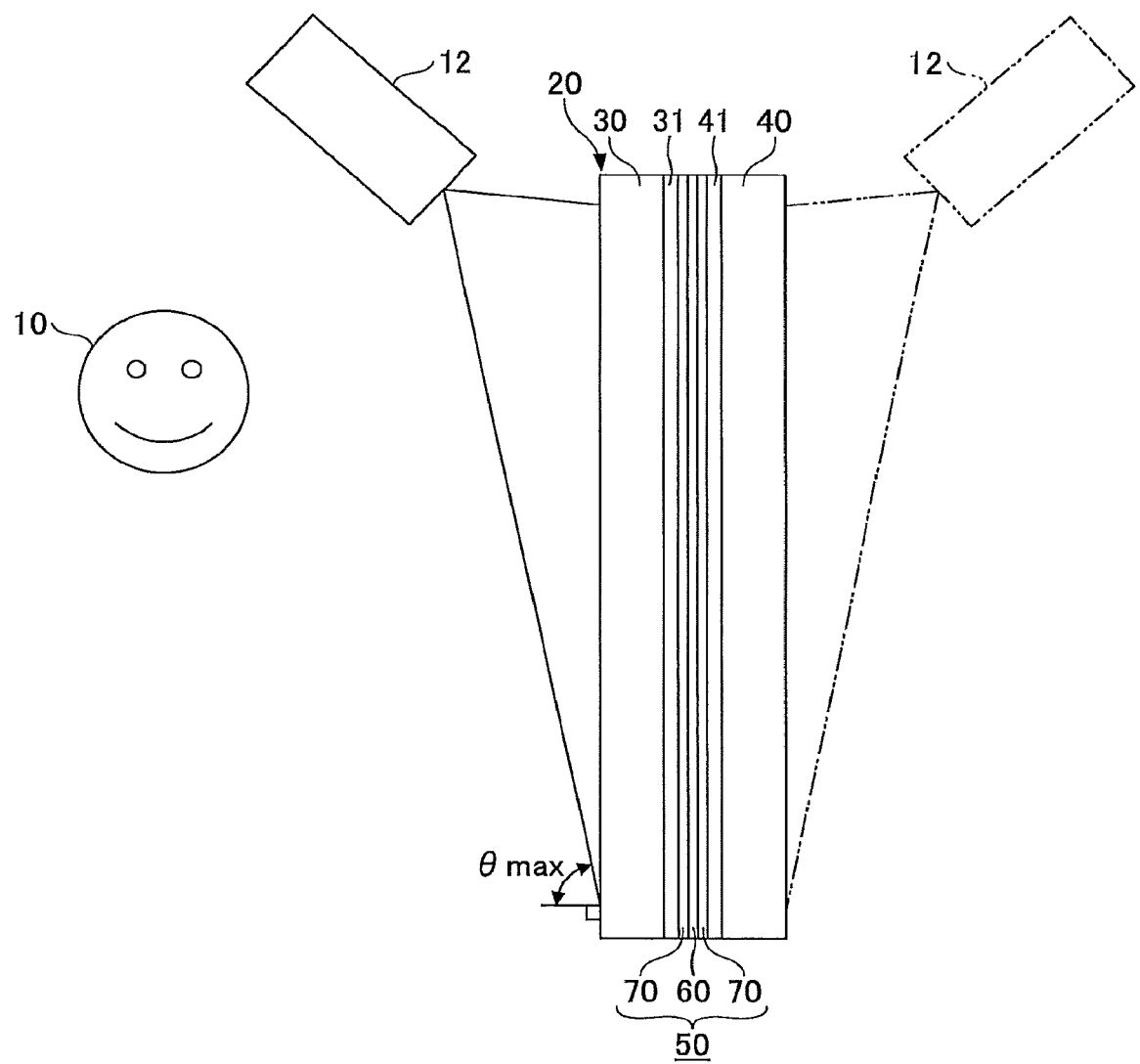
FIG. 1 is a side view of an image display system according to an embodiment.

In the following, with reference to drawings, embodiments for implementing the present invention will be described. In each drawing, the same or corresponding reference numeral is assigned to the same or corresponding component, and an explanation will be omitted.

(Image Display System)

FIG. 1 is a side view depicting an image display system according to the embodiment. A side of the image display system closer to a user 10 with reference to a transparent screen 20 (left part in FIG. 1) will be referred to as a front side. A side of the image display system farther to the user 10 with reference to the transparent screen 20 (right part in FIG. 1) will be referred to as a rear side. The same applies to FIG. 2 to FIG. 5. The image display system includes a projector 12 and the transparent screen 20.

(Projector)

The projector 12 projects images onto the transparent screen 20. A light of images projected from the projector 12 is a light with a polarization (in the following, referred also to as a "polarized light"). A polarization of a polarized light may be a linear polarization, a circular polarization, an elliptical polarization or the like. A polarization state may be a partial polarization, in which a distribution of oscillation directions of electric fields or the like is not uniform, or may be a complete polarization. The projector 12 is located anterior and/or posterior to the transparent screen 20.

(Transparent Screen)

The transparent screen 20 displays images projected from a front side of the screen and/or a rear side of the screen to a user on the front side of the screen, and enables the user on the front side of the screen to view a rear background behind the rear side of the screen. The rear background behind the rear side of the screen may be viewable when the images are not projected. When the images are projected, the rear background behind the rear side of the screen may be viewable or may not be viewable; however, preferably, the rear background behind the rear side of the screen is not viewable.

The transparent screen 20 may be a plane screen or may be a curved screen. The curved screen may have a convex shape toward the user 10 or may have a concave shape toward the user 10.

The transparent screen 20 includes, for example, a laminated plate configured of a plurality of transparent plates 30, 40, and a transparent screen sheet 50 arranged between the plurality of transparent plates 30, 40. The transparent screen sheet 50 is bonded to the transparent plate 30 by a bonding layer 31 and is bonded to the transparent plate 40 by a bonding layer 41.

(Transparent Plate)

The plurality of transparent plates 30, 40 cause the transparent screen sheet 50 to be interposed from both the front side and the rear side, and thereby hold the transparent screen sheet 50 from both the front side and the rear side. Each of the plurality of transparent plates 30, 40 is, for example, a glass plate. In this case, a laminated glass is obtained as a laminated plate.

Each of the plurality of glass plates, by which the transparent screen sheet 50 is interposed, may be a non-strengthened glass or may be a strengthened glass. The non-strengthened glass is obtained by forming a molten glass in a shape of plate, and cooling the glass slowly. The method of forming includes a float method, a fusion method and the like. The strengthened glass may be a physically strengthened glass or a chemically strengthened glass. The physically strengthened glass is obtained by rapidly cooling a uniformly heated glass plate from a temperature around a softening temperature so that a compression stress is generated on a glass surface according to a difference between a temperature of the glass surface and a temperature inside the glass, and thereby the glass surface is strengthened. The chemically strengthened glass is obtained by generating a compression stress on a glass surface according to an ion exchange process or the like, and thereby the glass surface is strengthened.

Note that each of the transparent plates 30, 40 according to the embodiment is a glass plate, but may be a resin plate. Moreover, one of the plurality of transparent plates 30, 40 may be a glass plate and the other may be a resin plate. Furthermore, the number of transparent plates included in the laminated plate may be three of more.

The plurality of bonding layers 31, 41 are arranged so that the transparent screen sheet 50 is interposed between the bonding layers, and bond the transparent screen sheet 50 to the plurality of transparent plates 30, 40. Thicknesses of the bonding layers are not limited, but, for example, fall within a range of 0.01 to 1.5 mm, and preferably fall within a range of 0.3 to 0.8 mm.

(Bonding Layer)

The plurality of bonding layers 31, 41 may be formed of different materials from each other, but are preferably formed of the same material. The bonding layers 31, 41 are formed of, for example, a thermoplastic resin, a thermosetting resin, or an ultraviolet curable resin.

In the case of the thermoplastic resin or the thermosetting resin, a bonding is performed by a heat treatment. In contrast, in the case of the ultraviolet curable resin, the bonding is performed by ultraviolet light irradiation.

The thermoplastic resin may include, for example, an ethylene-vinyl acetate copolymer, a polyvinyl butyral, a plasticized polyvinyl acetal, a plasticized polyvinyl chloride, a plasticized saturated thermoplastic polyester, a thermoplastic polyurethane, an ethylene-ethyl acrylate copolymer, and the like.

The thermosetting resin may include an acrylic thermosetting resin, a thermosetting epoxy resin, a polyurethane-based curing resin, and the like.

The ultraviolet curable resin may include an acrylic photo-curable resin, a photo-curable epoxy resin, a urethane acrylate-based photo-curable resin, and the like.

(Transparent Screen Sheet)

The transparent screen sheet 50 is used being interposed between the plurality of transparent plates 30, 40. The transparent screen sheet 50 is not required to have flexibility, but preferably has flexibility. A thickness of the transparent screen sheet 50 can be set as desired depending on a manufacturing method of the transparent screen sheet 50, a visibility of projected images, or the like, and preferably falls within a range of 0.02 to 1.5 mm, for example.

The transparent screen sheet 50 includes an image display layer 60 and a resin film 70. The image display layer 60 displays images projected from the projector 12. A size of a main surface of the image display layer 60 is the same as a size of a main surface of the resin film 70, but may be less than the size of the main surface of the resin film 70. The resin film 70 holds the image display layer 60. The resin film 70 may hold a plurality of image display layers 60, spaced at intervals, having smaller main surfaces than that of the resin film 70.

Two resin films 70 may hold the image display layer 60, one on each side in the front-rear direction. One of the resin films 70 is used as a base material film, and another resin film is used as a protection film. The base material film is a base material used for forming the image display layer 60. The protection film protects the image display layer 60.

In the case where the resin films 70 are arranged on both sides interposing the image display layer 60, the resin film 70 on the front side and the resin film 70 of the rear side may be formed of the same material or may be formed of different materials from each other, but are preferably formed of the same material. Moreover, when the resin film 70 has adhesiveness, the resin film 70 may double as the bonding layers 31, 41.

Note that the resin film 70 may hold the image display layer 60 only from one side, and either one of the base material film and the protection film may be absent. In the case where the base material film is absent, the image display layer 60 is formed on a surface of either one of the plurality of transparent plates 30, 40. In the case where the protection film is absent, the image display layer 60 is protected by the plurality of transparent plates 30, 40.

(Reflection Type Transparent Screen)

Figure 2:
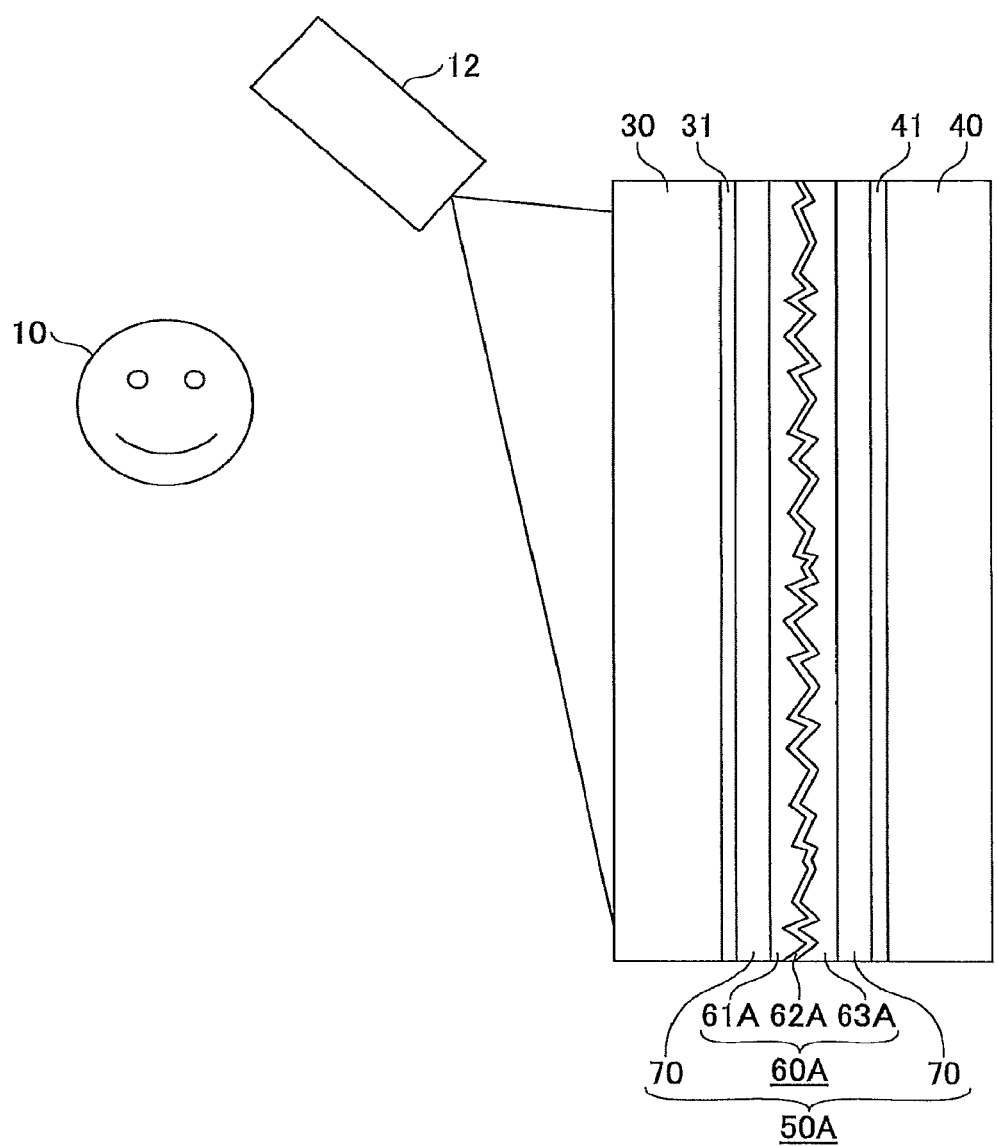
FIG. 2 is a side view depicting an example of a reflection-type transparent screen according to the embodiment.

FIG. 2 is a side view depicting an example of a reflection type transparent screen. The reflection type transparent screen, illustrated in FIG. 2, includes a reflection type image display layer 60A. The image display layer 60A is provided with an irregular layer 61A, a light transmission diffusion reflection layer 62A, and a coating layer 63A, in this order.

The reflection type transparent screen sheet 50A is configured of the image display layer 60A and the resin films 70.

The irregular layer 61A is formed on a surface of the base material film, and has an irregular pattern on a surface opposite to the base material film. The irregular layer 61A may be formed of a resin. For the irregular layer 61A, a resin to be used for the bonding layer 31 or the bonding layer 41 may be used. A formation method of the irregular layer 61A includes, for example, an imprint method. In the imprint method, a resin material of any of a photo-curable resin, a thermoplastic resin, and a thermosetting resin may be used.

The light transmission diffusion reflection layer 62A is formed along the irregular pattern on the surface of the irregular layer 61A in staggered fashion. The light transmission diffusion reflection layer 62A reflects a part of a light from a front side and from a rear side, and transmits another part of the light from the front side and from the rear side. The light transmission diffusion reflection layer 62A has an irregular pattern on a front surface, and diffuses and reflects a light of images projected from the front side to the front side, and thereby displays images.

The light transmission diffusion reflection layer 62A may be formed of a material that reflects light, e.g. a metal such as aluminum or silver, a metal oxide, or metal nitride. The light transmission diffusion reflection layer 62A may have a single layered structure or may have a multi-layered structure. For forming the light transmission diffusion reflection layer 62A, e.g. a vacuum deposition method or a sputtering method is used.

The coating layer 63A embeds the irregular pattern on the surface of the light transmission diffusion reflection layer 62A. The coating layer 63A may be formed of a resin, and preferably formed of the same resin as the irregular layer 61A.

Moreover, when a diffuse reflection factor of the light transmission diffusion reflection layer 62A is high, the iridescent stripe pattern is observed more conspicuously.

(Variation of Reflection Type Transparent Screen)

Figure 3:
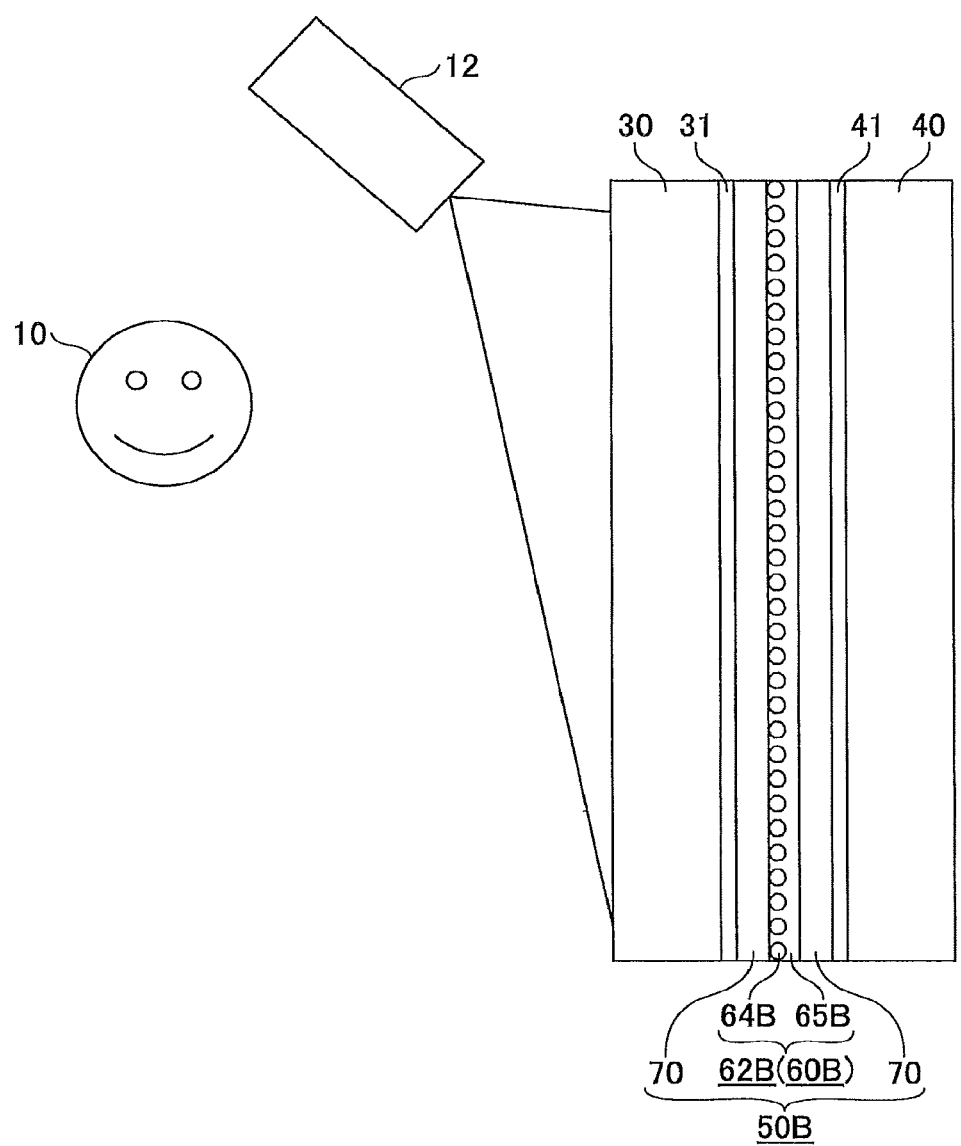
FIG. 3 is a side view depicting a variation of the reflection-type transparent screen according to the embodiment.

FIG. 3 is a side view depicting a variation of the reflection type transparent screen. The reflection type transparent screen, illustrated in FIG. 3, has a reflection type image display layer 60B. The reflection type image display layer 60B includes a light transmission diffusion reflection layer 62B. The reflection type transparent screen sheet 50B is configured of the image display layer 60A and the resin films 70.

The light transmission diffusion reflection layer 62B is formed on a surface of the base material film. The light transmission diffusion reflection layer 62B includes a plurality of light reflection particles 64B, and a transparent material 65B formed of a resin or the like that holds the light reflection particles 64B. The plurality of light reflection particles 64B are arranged in line at intervals, viewed in the front-rear direction. The light transmission diffusion reflection layer 62B reflects a part of a light from a front side and from a rear side, and transmits another part of the light from the front side and from the rear side. The light transmission diffusion reflection layer 62B has a plurality of light reflection particles 64B arranged in line at intervals, viewed in the front-rear direction, and diffuses and reflects to the front side a light of images projected from the front side, and thereby displays images.

The light reflection particles 64B included in the light transmission diffusion reflection layer 62B may be formed of a material that reflects light, e.g. a metal such as aluminum, silver, or gold, a metal oxide such as an ITO, an ATO, a titania, or a zirconia, a metal nitride such as $Si_3N_4$, or TaN, or a mineral such as a diamond. Moreover, the light reflection particles may be subjected to be coating treatment.

Note that the light transmission diffusion reflection layer is not limited to the light transmission diffusion reflection layer 62A, illustrated in FIG. 2, or the microarray type light transmission diffusion reflection layer 62B, illustrated in FIG. 3. However, the light transmission diffusion reflection layer may be, for example, a hologram type light transmission diffusion reflection layer. The hologram type light transmission diffusion reflection layer diffracts a light with a plurality of orders.

(Transmission Type Transparent Screen)

Figure 4:
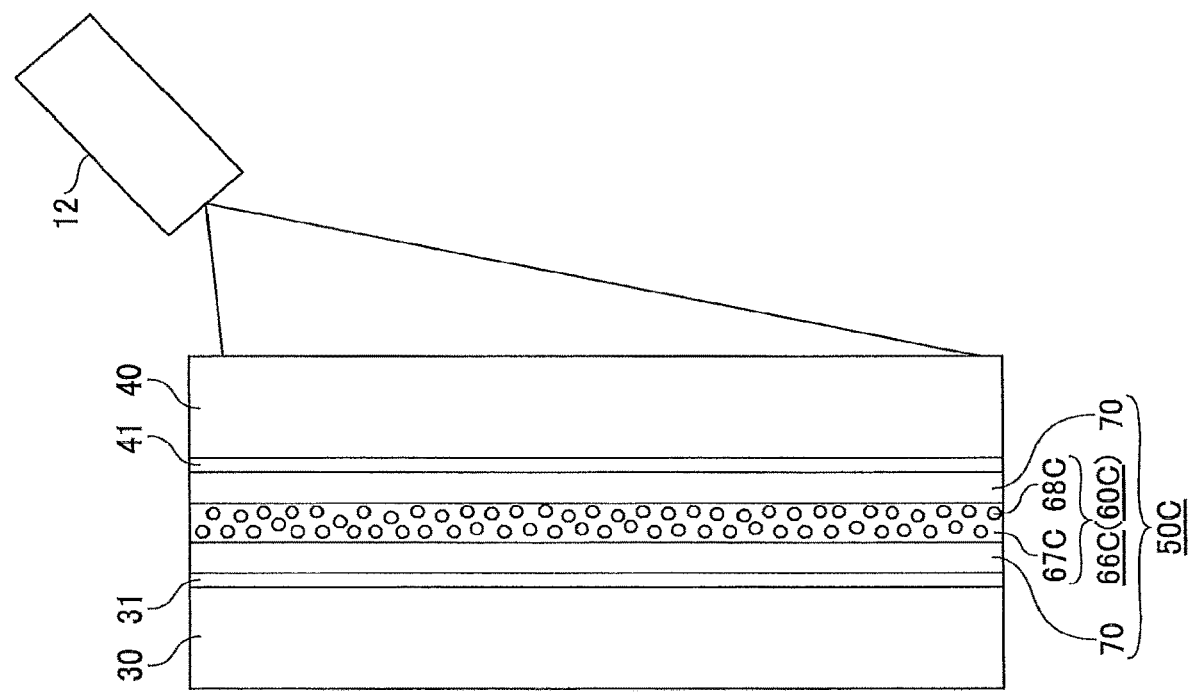
FIG. 4 is a side view depicting an example of a transmission type transparent screen according to the embodiment.
Figure 4:
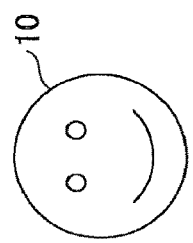

FIG. 4 is a side view depicting an example of a transmission type transparent screen. The transmission type transparent screen, illustrated in FIG. 4, has a transmission type image display layer 60C. The image display layer 60C includes a light transmission scattering layer 66C. The transmission type transparent screen sheet 50C is configured of the image display layer 60C and the resin films 70.

The light transmission scattering layer 66C is formed on the surface of the base material film. The light transmission scattering layer 66C scatters a part of a light from a front side and from a rear side, and transmits another part of the light from the front side and from the rear side. The light transmission scattering layer 66C scatters a light of images projected from the rear side, and thereby displays images to a user 10 on the front side.

The light transmission scattering layer 66C includes a transparent material 67C and a light scattering material 68C dispersed in the transparent material 67C. For the transparent material 67C, for example, a transparent resin is used. The transparent resin includes a photo-curable resin such as an acrylic resin or an epoxy resin, a thermosetting resin, a thermoplastic resin, or the like. For the light scattering material 68C, a material having a refractive index different from the transparent material 67C is used. For example, for the light scattering material 68C, fine particles of an inorganic material, fine particles of an organic material, voids, or the like are used. For the inorganic material, a high refractive index material such as a titanium oxide (refractive index is 2.5 to 2.7), a zirconium oxide (refractive index is 2.4), aluminum oxide (refractive index is 1.76), a diamond (refractive index is 2.4), or a diamond-like carbon; or a low refractive index material such as a porous silica (refractive index is 1.25 or less), or a hollow silica (refractive index is 1.25 or less) is used.

The light transmission scattering layer 66C may further include a light absorption material inside the layer. For the light absorption material, carbon black, titanium black or the like can be used. The light absorption material absorbs a part of light propagating inside the light transmission scattering layer 66C, and thereby controls the propagation of the light according to repeated reflections of light inside the transparent screen. According to the above-described configuration, unnecessary light that does not contribute to the display of the images can be absorbed, and a contrast of the images can be enhanced.

The light transmission scattering layer 66C is formed, for example, by applying a liquid containing a transparent material 67C and a light scattering material 68C on a surface of the base material film, and performing a heat treatment. The liquid to be applied on the surface of the base material film may contain a light absorption material in addition to the transparent material 67C and the light scattering material 68C. Note that when the transparent material 67C is a thermoplastic resin, the light transmission scattering layer 66C can be formed by kneading and dispersing the light scattering material 68C in a heated and melted thermoplastic resin, and forming the resin into a shape of a sheet.

Note that the light transparent scattering layer 66C may be formed by implanting a light scattering material 68C on a surface of a sheet formed of a transparent material 67C, and sintering the sheet. In this case, a base material film is unnecessary. In this case, the light scattering material 68C is preferably implanted around a front surface of the light transmission scattering surface 66C and sintered. Furthermore, in this case, the transparent plate 30 may be absent, and the light transmission scattering layer 66C may be an outermost layer. When the light scattering material 68C is present around the front surface of the light transmission scattering layer 66C, a regular reflection light of a light from the projector 12 can be controlled.

Moreover, when a haze of the light transmission scattering layer 66C is high, an iridescent stripe pattern is observed more conspicuously.

(Variation of Transmission Type Transparent Screen)

Figure 5:
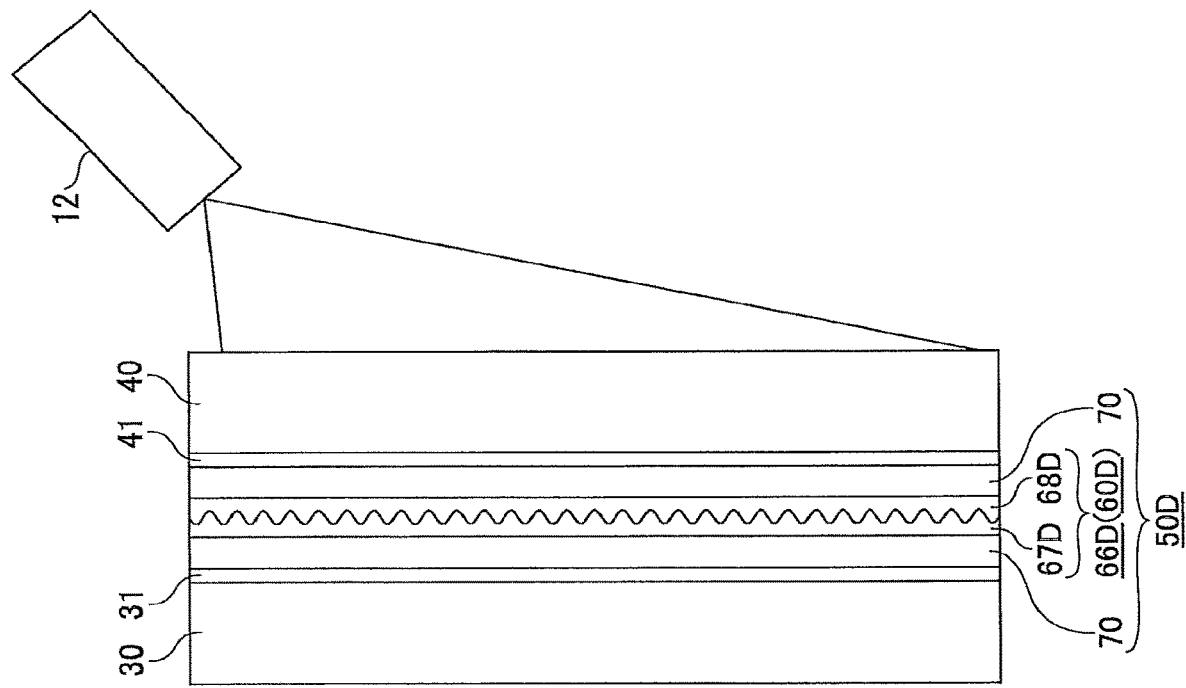
FIG. 5 is a side view depicting a variation of the transmission type transparent screen according to the embodiment.
Figure 5:
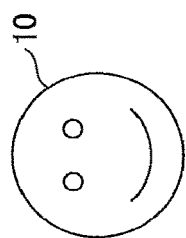

FIG. 5 is a side view depicting a variation of the transmission-type transparent screen according to the embodiment. The transmission-type transparent screen, illustrated in FIG. 5, is provided with a transmission-type image display layer 60D. The transmission-type image display layer 60D has a light transmission scattering layer 66D. The transmission-type transparent screen sheet 50D is configured of the image display layer 60D and the resin film 70.

The light transmission scattering layer 66D is formed on a surface of the base material film. The light transmission scattering layer 66D scatters a part of a light from a front side and from a rear side, and transmits another part of the light from the front side and from the rear side. The light transmission scattering layer 66D scatters a light of images projected from the rear side, and thereby displays images to a user 10 on the front side. The light transmission scattering layer 66D includes an irregular layer 67D and a coating layer 68D.

The irregular layer 67D is formed on a surface of the base material film, and has an irregular pattern on a surface opposite to the base material film. The irregular layer 67D may be formed of a resin. A formation method of the irregular layer 67D includes, for example, an imprint method. In the imprint method, a resin material of any of a photo-curable resin, a thermoplastic resin, and a thermosetting resin may be used.

The coating layer 68D embeds the irregular pattern on a surface of the irregular layer 67D. For the coating layer 68D, a material having a refractive index different from the irregular layer 67D is used. At an interface between the coating layer 68D and the irregular layer 67D, a light is scattered.

The light transmission scattering layer 66D may further include a light absorption material inside the layer. The light absorption material is included in at least one of the irregular layer 67D and the coating layer 68D. For the light absorption material, carbon black, titanium black, organic dye or the like can be used. The light absorption material absorbs a part of light propagating inside the light transmission scattering layer 66D, and thereby controls the propagation of the light according to repeated reflections of light inside the transparent screen. According to the above-described configuration, unnecessary light that does not contribute to the display of the images can be absorbed, and a contrast of the images can be enhanced.

(Resin Film)

In at least one of the resin films 70, within a region on the main surface of the resin film 70 overlapping with the image display layer 60, a difference between the maximum value and the minimum values of retardations is 115 nm or less. The retardations (phase differences due to multiple refractive indices) are measured by irradiating the main surface of the resin film 70 with a light having a wavelength of 460 nm in a direction orthogonal to the main surface. Note that in the case where the resin film 70 supports a plurality of image display layers 60 having main surfaces that are smaller than the resin film 70 at intervals, the difference may be one-fourth of the wavelength of the light or less (i.e. 115 nm or less) for each region on the main surface of the resin film 70 that overlaps with the image display layer 60.

In the case where the difference is one-fourth of the wavelength of the light or less (i.e. 115 nm or less), when images that are polarized light are projected, a variation in polarization states that change by passing through the resin film 70 (e.g. including oscillation directions of electric fields, or the like) by locations is small. Thus, a variation in light amounts of polarized light emitted from the resin film 70 by locations is small, and control against the generation of an iridescent stripe pattern is enabled.

The aforementioned effect is more marked in the case of using a short focal length projector as the projector 12. The short focal length projector is arranged so that the maximum value $\theta_{max}$ (See FIG. 1) of angles $\theta$ (not shown) between a line (normal) orthogonal to an image projection surface (front surface in the case of reflection-type, rear surface in the case of transmission-type) passing through an intersection point of the respective beam of images with the image projection surface, and the respective beam of images, is 45° or more. The aforementioned angle $\theta$ between the normals and the beams is defined so as to be zero when the normals and the beams coincide with each other. As the angle $\theta_{max}$ increases, a light path length in the resin film 70 becomes longer and a change in a polarization state becomes greater, and thereby a marked effect of controlling against generation of an iridescent stripe pattern can be obtained.

A screen, on which images are projected from a short focal length projector, includes, for example, a front windshield of a vehicle. In this case, the short focal length projector is arranged in a dashboard or the like.

In at least one of the resin films 70, at a desired position in a region on the main surface of the resin film 70 overlapping with the image display layer 60, a retardation is preferably one-fourth of the wavelength of the light or less (i.e. 115 nm or less). By controlling a variation in retardations, generation of an iridescent stripe pattern can be controlled against.

In at least one of the resin films 70, at a desired position in a region on the main surface of the resin film 70 overlapping with the image display layer 60, a retardation is more preferably one-eighth of the wavelength of the light or less (i.e. 57.5 nm or less), and is further preferably one-sixteenth of the wavelength of the light or less (i.e. 28.75 nm or less).

For the resin film 70, from a viewpoint of controlling the variation in retardations, an amorphous resin film is used. The amorphous resin includes, for example, a material having a cyclic olefin structure, specifically cycloolefin polymer, cycloolefin copolymer, and the like. Other amorphous resin includes triacetyl cellulose, polycarbonate subjected to a low retardation treatment, polyvinyl butyral, ethylene vinyl acetate copolymer, poly (meta) acrylate, and the like. The amorphous resin film may be a stretched film or may be a non-stretched film.

Note that in the embodiment, for the resin film 70, an amorphous resin film is used. However, as long as a non-stretched film is used, a crystalline resin film may be used. When a non-stretched film of a crystalline resin is used, variation in retardations can be controlled.

In the case where the resin film 70 is a stretched film of a crystalline resin, variation in retardations is large. However, even in this case, as long as a light of images projected from the projector 12 is a light with a linear polarization, control against generation of an iridescent stripe pattern is enabled by adjusting a direction of the stretched film.

Typically, for the stretched film, for example, a biaxial stretched film, or a longitudinal uniaxial stretched film is used. The biaxial stretched film is stretched in two directions, i.e. in a longitudinal (machine direction (MD)) and in a transverse direction (TD) while conveyed in the longitudinal direction, and formed in a strip shape. The longitudinal uniaxial stretched film is stretched in a longitudinal direction while conveyed in the longitudinal direction, and formed in a strip shape.

When the resin film 70 is a stretched film of a crystalline resin, one of the longitudinal direction and the transverse direction is likely to coincide with a fast axis, and the other is likely to coincide with a slow axis. In this case, viewed from a direction orthogonal to a main surface of the stretched film, when an angle α (not shown) between the longitudinal direction of the stretched film and an oscillation direction of an electric field of the linear polarization is 10° or less, generation of stripe pattern can be controlled against. The angle α is preferably 5° or less, and more preferably 3° or less. The angle α is defined as 0° when the longitudinal direction of the stretched film coincides with an oscillation direction of an electric field of a linear polarization.

However, because unevenness of the optical axes (fast axis, or slow axis) may occur, the resin film 70 is preferably an amorphous film or a non-stretched film of a crystalline resin.

EXAMPLES

Practical Example 1

In the practical example 1, a reflection-type transparent screen as illustrated in FIG. 2 was prepared.

First, a transparent screen sheet having a base material film, an irregular layer, a light transmission diffusion reflection layer, a coating layer, and a protection film, in this order, was prepared. An image display layer was configured of the irregular layer, the light transmission diffusion reflection layer and the coating layer.

For the base material film and the protection film, COC films each with a thickness of 100 μm were provided. COC is an abbreviation of cycloolefin copolymer, and is a copolymer of ethylene and norbornene. Each COC film was subjected to an easy adhesion treatment on a surface. In a region on a main surface of each COC film overlapping with the image display layer, a difference between the maximum value and the minimum value of retardations was 3 nm. Moreover, at a desired position in the region on the main surface of each COC film overlapping with the image display layer, the retardation fell within a range of 4 to 7 nm.

The irregular layer was prepared by using an imprint method. Specifically, the irregular layer was prepared by interposing a UV curable monomer between the base material film and a mold, transferring irregular patterns to the UV curable monomer, and curing the UV curable monomer by ultraviolet ray. The UV monomer was applied onto the easy adhesion treated surface of the base material film by a die coating method before pressing with the mold, to form a layer with a thickness of 10 μm. For the mold, a polyethylene terephthalate film (PET film) on which an irregular pattern was formed by a sandblast treatment was used. The curing process by ultraviolet ray was performed by irradiating with an ultraviolet ray with a wavelength of 365 nm for about 1000 mJ.

The light transmission diffusion reflection layer was prepared by depositing an Al film on an irregular surface of the irregular layer by a sputtering method. The Al film was deposited so that a transmissivity was 50%.

The coating layer was prepared by using the same UV curable monomer as that used for preparing the irregular layer. Specifically, the coating layer was prepared by filling with an UV curable monomer on the irregular surface of the light transmission diffusion reflection layer, placing the protection film with an easy adhesion treated surface facing downward, and curing the UV curable monomer with an ultraviolet ray. The curing process by ultraviolet ray was performed by irradiating with an ultraviolet ray for about 1000 mJ.

Then, using two transparent plates and two adhesion layers, in addition to the transparent screen sheet prepared as above, a reflection-type transparent screen sheet was prepared. For each transparent plate, a glass plate with a thickness of 2 mm was provided in advance. For each adhesion layer, a PVB (polyvinyl butyral) film with a thickness of 0.4 mm was provided in advance. Each PVB film was subjected to an emboss processing on both surfaces.

The transparent screen was manufactured by a degassing process, a first heat treatment process, and a second heat treatment process. In the degassing process, the transparent plate, the adhesion layer, the transparent screen sheet, the adhesion layer and the transparent plate were laminated in this order, putting the obtained laminated body into a vacuum bag, and degassing an inside of the vacuum bag. In the first heat treatment process, a heat treatment was performed for the vacuum bag containing the laminated body in an atmospheric furnace. In the second heat treatment process, the laminated body was extracted from the vacuum bag after the first heat treatment process, and a pressure and heat treatment was performed for the laminated body in an autoclave.

When images were projected from a front direction onto the transparent screen that was prepared, an iridescent stripe pattern was not found and excellent images were obtained. When images were projected onto the transparent screen from an oblique direction, an iridescent stripe pattern was not found and excellent images were obtained. Note that for a projector for projecting images, a short focal length projector (laser projector seeser, by ESplus, Inc.) was used.

Comparative Example 1

In a comparative example 1, a reflection-type transparent screen was prepared under the same condition as the practical example 1 except that for the base material film and the protection film, PET films were used instead of COC films. In a region on a main surface of each PET film overlapping with an image display layer, a difference between the maximum value and the minimum value of retardations was 400 nm. Moreover, at a desired position in the region on the main surface of each PET film overlapping with the image display layer, the retardation fell within a range of 2800 to 3200 nm. Each PET film was a biaxial stretched film of a crystalline resin. When viewing from a normal direction to a main surface of the biaxial stretched film, an angle α between a longitudinal direction of the biaxial stretched film and an oscillation direction of an electric field of a linear polarization was 45°.

When images were projected from a front direction onto the transparent screen that was prepared, an iridescent stripe pattern was partially found, and excellent images could not be obtained. Moreover, when images were projected onto the transparent screen from the oblique direction, the iridescent stripe pattern was more noticeable. Note that for the projector for projecting images, the short focal length projector that was the same as in the practical example 1 was used.

Practical Example 2

In a practical example 2, a transmission-type transparent screen, as illustrated in FIG. 4, was prepared. First, a transparent screen sheet having a base material film, a light transmission scattering layer, and a protection film, in this order, was prepared. An image display layer was configured of the light transmission scattering layer.

For the base material film and the protection film, COC films with a thickness of 100 μm, which were the same as in the practical example 1, were provided. Each COC film was subjected to an easy adhesion treatment on a surface. In a region on a main surface of each COC film overlapping with an image display layer, a difference between the maximum value and a minimum value of retardations was 3 nm. Moreover, at a desired position in the region on the main surface of each COC film overlapping with the image display layer, the retardation fell within a range of 4 to 7 nm.

The light transmission scattering layer was prepared by drying a coating liquid applied on the easy adhesion treated surface of the base material film at 100° C. A thickness of the light transmission scattering layer was 4 μm. For the coating liquid, a mixed liquid including methyl ethyl ketone of 92.9 wt %, titania particles having particle diameter of 250 nm of 0.1 wt %, and polyvinyl butyral of 7 wt %, was provided in advance.

The protection film was placed on the coating liquid with an easy adhesion treated surface facing downward, before drying the coating liquid.

Then, using two transparent plates and two adhesion layers, in addition to the transparent screen sheet prepared as above, a transmission-type transparent screen sheet was prepared. The transparent screen was prepared under the same condition as in the practical example 1, except for the type of the transparent screen sheet.

When images were projected from a front direction onto the transparent screen that was prepared, an iridescent stripe pattern was not found and excellent images were obtained. Moreover, when images were projected onto the transparent screen from the oblique direction, an iridescent stripe pattern was not found and excellent images were obtained. Note that for the projector for projecting images, the short focal length projector that was the same as the practical example 1 was used.

Comparative Example 2

In a comparative example 2, a transmission-type transparent screen was prepared under the same condition as the practical example 2 except that for the base material film and the protection film, PET films were used instead of COC films. In a region on a main surface of each PET film overlapping with an image display layer, a difference between the maximum value and the minimum value of retardations was 400 nm. Moreover, at a desired position in the region on the main surface of each PET film overlapping with the image display layer, the retardation fell within a range of 2800 to 3200 nm. Each PET film was a biaxial stretched film of a crystalline resin. When viewing from a normal direction to a main surface of the biaxial stretched film, an angle α between a longitudinal direction of the biaxial stretched film and an oscillation direction of an electric field of a linear polarization was 45°.

When video images were projected from a front direction onto the transparent screen that was prepared, an iridescent stripe pattern was partially found, and excellent images could not be obtained. Moreover, when images were projected onto the transparent screen from the oblique direction, the iridescent stripe pattern was more noticeable. Note that for the projector for projecting images, the short focal length projector that was the same as the practical example 1 was used.

As described above, embodiments and the like of the transparent screen have been described. The present invention is not limited to the embodiments or the like. Various variations and enhancements may be made without departing from the scope of the present invention.

For example, the transparent screen 20 may further include a functional layer (not illustrated). The functional layer may include, for example, a light antireflection layer for reducing reflection of light, a light attenuation layer for attenuating a part of light, and an infrared ray shielding layer for controlling transmission of infrared ray. Furthermore, the functional layer, with which the transparent screen 20 is provided, may include an oscillation layer that oscillates when an electric voltage is applied and that functions as a speaker, and a sound insulation layer that controls transmission of sound. A number of the functional layer and a position of the functional layer are not particularly limited.

Moreover, the transparent screen 20 may include only one of the plurality of transparent plates 30, 40. In this case, the transparent screen sheet 50 that is used adheres to only one of the plurality of transparent plates 30, 40.

Moreover, the transparent screen 20 may be provided with both a reflection-type image display layer and a transmission-type image display layer, and may display images projected from a front side of the screen and from a rear side of the screen to a user 10 on the front side of the screen. The reflection-type image display layer and the transmission-type image display layer may be supported by the same resin film 70, or may be supported by differing resin films 70.

REFERENCE SIGNS LIST 10 user
12 projector
20 transparent screen
30 transparent plate
40 transparent plate
50 transparent screen sheet
60 image display layer
60A reflection-type image display layer
61A irregular layer
62A light transmission diffusion reflection layer
63A coating layer
60B reflection-type image display layer
62B light transmission diffusion reflection layer
60C transmission-type image display layer
66C light transmission scattering layer
60D transmission-type image display layer
66D light transmission scattering layer
70 resin film

What is claimed is:

1. A transparent screen sheet that displays images projected from a front side of the transparent screen sheet to a user on the front side of the transparent screen sheet, and causes the user on the front side of the transparent screen sheet to view a rear background behind the rear side of the transparent screen sheet, the transparent screen sheet comprising:
   an image display layer configured to display the images; and
   a resin film that holds the image display layer,
   wherein a difference between a maximum value and a minimum value of retardations of the resin film measured by irradiating a main surface of the resin film with a light having a wavelength of 460 nm in a direction orthogonal to the main surface, within a region on the main surface of the resin film that overlaps with the image display layer, is less than or equal to one fourth of the wavelength of the light,
   wherein the image display layer comprises a light transmission diffusion reflection layer configured to diffuse and reflect to the front side a light of the images projected from the front side, to display the images to the user on the front side, and wherein the resin film is arranged on both sides of the image display layer, the image display layer being interposed between resin films.

2. The transparent screen sheet according to claim 1, wherein at any position in the region on the main surface of the resin film that overlaps with the image display layer, the retardation of the resin film is one-fourth of the wavelength of the light or less.

3. The transparent screen sheet according to claim 1, wherein at a desired position in the region on the main surface of the resin film that overlaps with the image display layer, the retardation of the resin film is one-eighth of the wavelength of the light or less.

4. The transparent screen sheet according to claim 1, wherein at a desired position in the region on the main surface of the resin film that overlaps with the image display layer, the retardation of the resin film is one-sixteenth of the wavelength of the light or less.

5. The transparent screen sheet according to claim 1, wherein the resin film comprises at least one of a cycloolefin polymer and cycloolefin copolymer.

6. A transparent screen comprising:
   the transparent screen sheet according to claim 1; and
   a transparent plate that holds the transparent screen sheet.

7. An image display system comprising:
   the transparent screen according to claim 6; and
   a projector configured to project images onto the transparent screen,
   wherein a light of the images projected from the projector is a polarized light.

8. The image display system according to claim 7, wherein the projector is a short focal length projector.

9. The transparent screen sheet according to claim 1, wherein the image display layer comprises the light transmission diffusion reflection layer, and wherein the light transmission diffusion reflection layer is formed on a surface of the resin film.

10. A transparent screen sheet that displays images projected from a front side of the transparent screen sheet to a user on the front side of the transparent screen sheet, and causes the user on the front side of the transparent screen sheet to view a rear background behind the rear side of the transparent screen sheet, the transparent screen sheet comprising:
    an image display layer configured to display the images; and
    a resin film that holds the image display layer,
    wherein a difference between a maximum value and a minimum value of retardations of the resin film measured by irradiating a main surface of the resin film with a light having a wavelength of 460 nm in a direction orthogonal to the main surface, within a region on the main surface of the resin film that overlaps with the image display layer, is less than or equal to one fourth of the wavelength of the light,
    wherein the image display layer comprises a light transmission diffusion reflection layer configured to diffuse and reflect to the front side a light of the images projected from the front side, to display the images to the user on the front side, and
    wherein the image display layer comprises an irregular layer, the light transmission diffusion reflection layer, and a coating layer, in this order.

* * * * *